US00RE41725E

(19) United States
(12) Reissued Patent
Walburn

(10) Patent Number: US RE41,725 E
(45) Date of Reissued Patent: Sep. 21, 2010

(54) LATERALLY STABILIZING DRAWER SLIDE FOR TALL CUPBOARD PULL-OUT

(75) Inventor: William L. Walburn, Muncie, IN (US)

(73) Assignee: Rev-A-Shelf Company, LLC, Jeffersontown, KY (US)

(21) Appl. No.: 12/605,093

(22) Filed: Oct. 23, 2009

Related U.S. Patent Documents

Reissue of:
(64) Patent No.: 7,306,301
Issued: Dec. 11, 2007
Appl. No.: 10/883,166
Filed: Jul. 1, 2004

(51) Int. Cl.
*A47B 88/04* (2006.01)

(52) U.S. Cl. ..... 312/334.32; 312/334.27

(58) Field of Classification Search ..... 312/330.1, 312/334.13, 334.14, 331, 334.22, 334.24, 312/334.27, 334.28, 334.29, 334.31, 334.32, 312/334.33, 334.34, 334.35, 334.36, 334.37, 312/334.38, 334.39, 334.41, 334.42, 334.43; 384/18, 19, 20

See application file for complete search history.

(56) References Cited

U.S. PATENT DOCUMENTS

| | | | | |
|---|---|---|---|---|
| 1,212,992 A | | 1/1917 | O'Brien | |
| 3,912,341 A | * | 10/1975 | Stein | 384/18 |
| 4,095,853 A | | 6/1978 | MacDonald | 308/3.6 |
| 4,095,854 A | | 6/1978 | Teramachi | 308/6 C |
| 4,285,560 A | | 8/1981 | Miller | 312/331 |
| 4,387,942 A | | 6/1983 | Lense | 312/334 |
| 4,759,341 A | | 7/1988 | McFarland | 126/339 |
| 4,955,160 A | * | 9/1990 | Rock | 312/334.8 |
| 5,275,483 A | | 1/1994 | Rasmussen | 312/334.41 |
| 5,902,029 A | | 5/1999 | Fulterer | 312/334.29 |
| 5,944,400 A | | 8/1999 | Fulterer | 312/334.25 |
| 6,027,190 A | | 2/2000 | Stewart et al. | 312/201 |
| 6,039,423 A | | 3/2000 | Fulterer | 312/334.29 |
| 6,199,966 B1 | | 3/2001 | Fulterer | 312/334.24 |
| 6,412,892 B1 | | 7/2002 | Bonat | 312/334.47 |
| 6,499,819 B2 | | 12/2002 | Hoeppner | 312/334.44 |
| 6,511,140 B2 | | 1/2003 | Corona | 312/334.33 |
| 6,682,159 B2 | | 1/2004 | Compagnucci | 312/334.24 |

FOREIGN PATENT DOCUMENTS

| | | | |
|---|---|---|---|
| DE | 3120263 | * | 12/1982 |
| DE | 3120263 A1 | | 12/1982 |
| FR | 2584905 A1 | * | 1/1987 |
| FR | 2 584 905 | | 1/1987 |

* cited by examiner

*Primary Examiner*—James O Hansen
(74) *Attorney, Agent, or Firm*—Brinks Hofer Gilson & Lione

(57) ABSTRACT

A drawer slide system providing access and stability for side access drawers has a base including an outside pair of vertical webs and a centrally situated elevated portion. Vertically oriented drawer slides are coupled to each of the vertical webs and a horizontally oriented drawer slide is coupled to the centrally situated portion of the base. The vertically oriented drawer slides are coupled to outside margins of a side access drawer adjacent to a bottom of the drawer. The horizontally oriented drawer slide is coupled to a central portion of the bottom of the drawer. The base can be fixed to a bottom surface of a cabinet to position the side access drawer within a suitable drawer receiving opening in the cabinet.

20 Claims, 5 Drawing Sheets

LATERALLY STABILIZING DRAWER SLIDE FOR TALL CUPBOARD PULL-OUT

Matter enclosed in heavy brackets [ ] appears in the original patent but forms no part of this reissue specification; matter printed in italics indicates the additions made by reissue.

BACKGROUND

1. Technical Field

The present invention relates to drawer slides, useful on tall cupboard pull-outs from cabinets, to impart enhanced lateral stability, particularly such drawer slides as impart sufficient stability as to permit omission of any top drawer guide.

2. Background Information

Most drawers typically consist of a bottom surrounded by four upright members defining a back wall, two side walls, and a drawer front. The contents of the drawer can be accessed through an open horizontal plane defined generally by the upper margins of the back wall and two side walls. To facilitate such access, a drawer slide can be coupled to each side of the drawer and to each side of the drawer receiving opening in the cabinet holding the drawer. Each drawer slide consists generally of a first rail that is designed to be fixed to the side of the drawer and a second rail that is designed to be fixed to the cabinet. The first and second rails are coupled to each other by interengaging surfaces such a glides or bearings that facilitate relative movement between the two rails. A wide variety of such drawer slides exist that are suitable for use to permit drawers to move smoothly and easily in and out of cabinetry, particularly cabinetry typically found in kitchens.

Some drawers have a much different construction from that previously described. In particular, some drawers consist of a bottom, a back wall, a drawer front and one or more shelves or racks connected between the back wall and the drawer front. Access to the shelves or racks is gained through either of two vertical planes located on either side of the drawer and defined generally by the lateral margins of the back wall and bottom. In view of the desirability of maximizing the side access to such drawers, the use of side-mounded drawer slides is undesirable. As a result, some installations involve the use of a drawer slide mounted between the bottom of the side access drawer and the drawer receiving opening in the cabinet holding the drawer. If the side access drawer is much taller than it is wide, the drawer can exhibit significant vertical instability. To enhance the vertical stability of the side access drawer, another slide or guide is typically placed between the top of the back wall and the drawer front and coupled to the top of the drawer receiving opening in the cabinet holding the drawer. Examples of this construction are to be found, for example, in U.S. Pat. Nos. 6,199,966; 6,412,892; and 6,682,159. While this top slide or guide works satisfactorily to stabilize the side access drawer, it restricts access to the top shelf or rack in the drawer. If the top slide or guide could be eliminated, then access to the top shelf or rack is such a side access drawer could be through either vertical side plane as described before, or through the same horizontal plane as described previously.

Thus, there remains a need for a drawer supporting arrangement that will provide the desired access and stability to a side access drawer, and particularly to such side access drawers as have a vertical dimension that is much greater than the width of the drawer.

BRIEF SUMMARY

A drawer slide system that will provide the desired access and stability for a side access drawer can have a base that includes an outside pair of vertical webs and a centrally situated portion that is elevated with respect to lower margins of the outside pair of vertical webs. Vertically oriented drawer slides can be coupled to each of the vertical webs and a horizontally oriented drawer slide can be coupled to the centrally situated portion of the base. The vertically oriented drawer slides can be coupled to outside margins of a side access drawer adjacent to a bottom of the drawer. The horizontally oriented drawer slide can be coupled to a central portion of the bottom of the drawer. The base can be fixed to a bottom surface of a cabinet to position the side access drawer within a suitable drawer receiving opening in the cabinet.

The outside pair of vertical webs of the base can be separated from each other by a distance that is greater than the width of the drawer. The separation distance between the outside pair of vertical webs can be about the width of the opening in a cabinet intended to receive the side access drawer. The lower margins of the outside pair of vertical webs of the base can define a plane representing the supporting surface of the base. The vertically oriented drawer slides can be coupled to inside surfaces of the vertical webs. The centrally situated portion of the base can be elevated above the supporting surface by a distance sufficient to ensure that the horizontally oriented drawer slide can be brought into contact with and coupled to the bottom surface of the side access drawer. The base can have any convenient longitudinal dimension. A plurality of bases can be used together in a single installation to suitably position and support a single side access drawer within a cabinet opening.

Adapting elements of various designs can be used to couple the drawer slides to various surfaces of the side access drawer. For example, two longitudinal supports can be fixed to the bottom surface of the side access drawer. The two longitudinal supports can be spaced from each other by a spacer having a width exceeding the width of the horizontally oriented drawer slide so that a movable portion of the horizontally oriented drawer slide can be fixed to the bottom of the side access drawer between the two longitudinal supports. Movable portions of the vertically oriented drawer slides can be fixed to outside surfaces of the longitudinal supports.

The vertically oriented drawer slides of this system should be selected to provide the necessary load-carrying capacity for the side access drawer and any expected contents thereof. The horizontally oriented drawer slide can be similar in size to the vertically oriented drawer slides. The horizontally oriented drawer slide can be selected to provide optimum lateral stability to the side access drawer. One advantage of a drawer slide system of the present invention is that the system provides sufficient strength and stability to the side access drawer to permit omission of any top guide, which enhances the access to at least the top shelf in the side access drawer. A base of the drawer slide system of the present invention assures correct placement of the vertically and horizontally oriented drawer slides to achieve the desired operation and support of the side access drawer.

Other features and advantages of the present system will be come apparent from the following description of a preferred embodiment of the present invention, which should be considered in conjunction with the accompanying drawings.

DETAILED DESCRIPTION OF THE PREFERRED EMBODIMENTS

Figure 1:
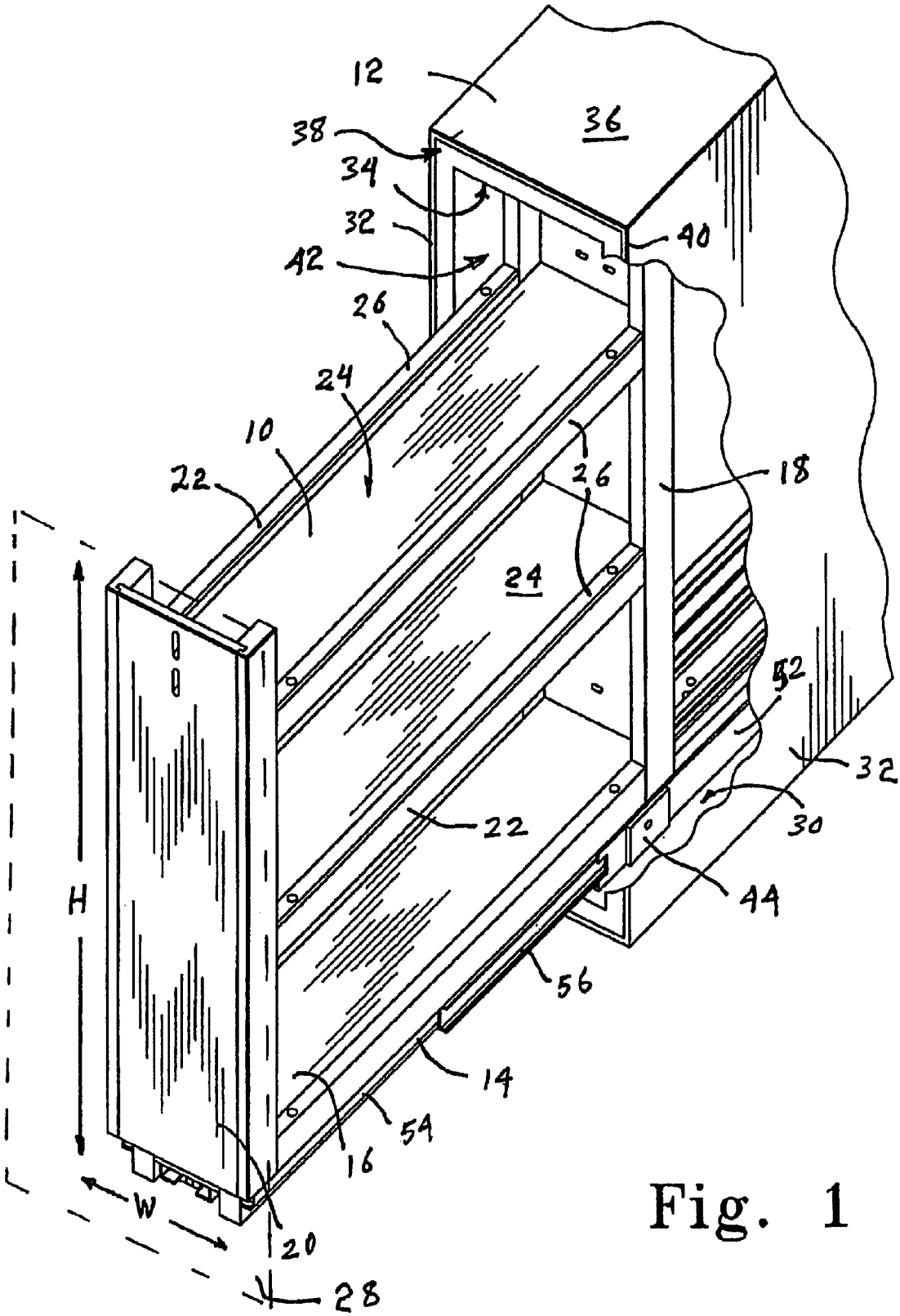
FIG. 1 is a perspective view of a cabinet and side access drawer using a drawer slide system of the present invention.

FIG. 1 shows a side access drawer 10 partially extending outward from a cabinet 12 on a drawer slide system 14 of the present invention. The drawer 10 can be seen to have a height H that is greater than its width W. The drawer 10 includes a bottom shelf 16, a back portion 18, and a front portion 20. Additional shelves 22 can extend between the back portion 18 and the front portion 20 at spaced vertical intervals above the bottom shelf 16. While the additional shelves 22 are shown to include solid planar horizontal surfaces 24 bounded laterally by ridges 26, it will be appreciated that the shelves 22 can be racks, supports, or holders of various shape and construction without departing from the present invention. An additional drawer front or cover 28, shown in phantom, can be attached to the front portion 20 to provide a decorative cover for the drawer 10 that can be coordinated with other decorative features or elements of the cabinet 12. The large H/W aspect ratio could contribute to vertical instability of the drawer 10 in the absence of the present invention.

The cabinet 12 can be seen to have a bottom surface 30 and vertical partitions 32 extending upward from the bottom surface 30. The vertical partitions 32 can extend upward to an under surface 34 of the cabinet top surface 36. A cabinet front 38 defines a perimeter 40 of an opening 42 in the cabinet 12 that receives the drawer 10. In general, the drawer front or cover 28 extends laterally outward by a distance sufficient to overlap the cabinet front 38 adjacent to the perimeter 40 to provide a stop for the inward movement of the drawer 10 into the cabinet 12. It is to be noted that there is no guide or slide attached between the top of the drawer 10 and the cabinet 12 since such a structure is rendered unnecessary by the present invention.

Figure 2:
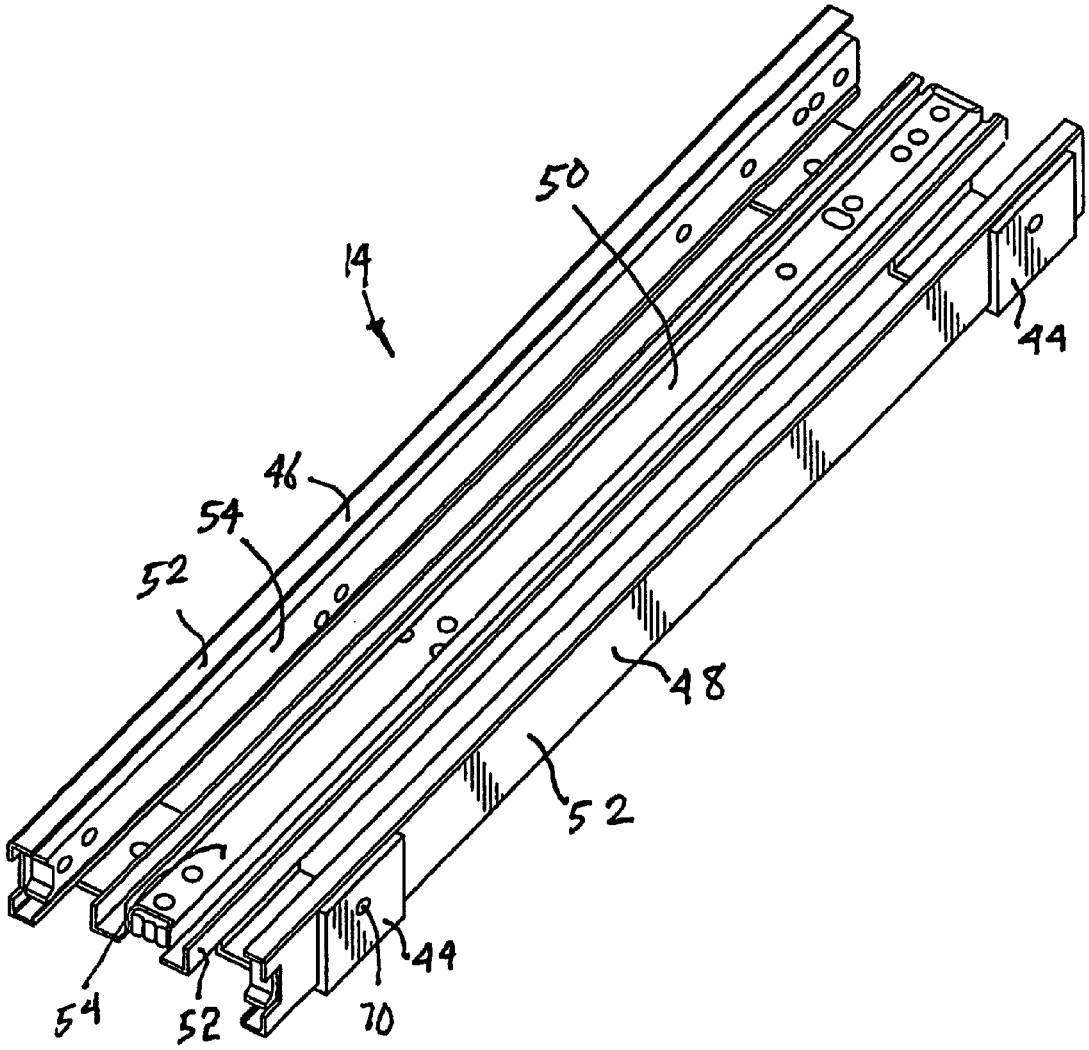
FIG. 2 is a perspective view of a drawer slide assembly of the present invention.
Figure 3:
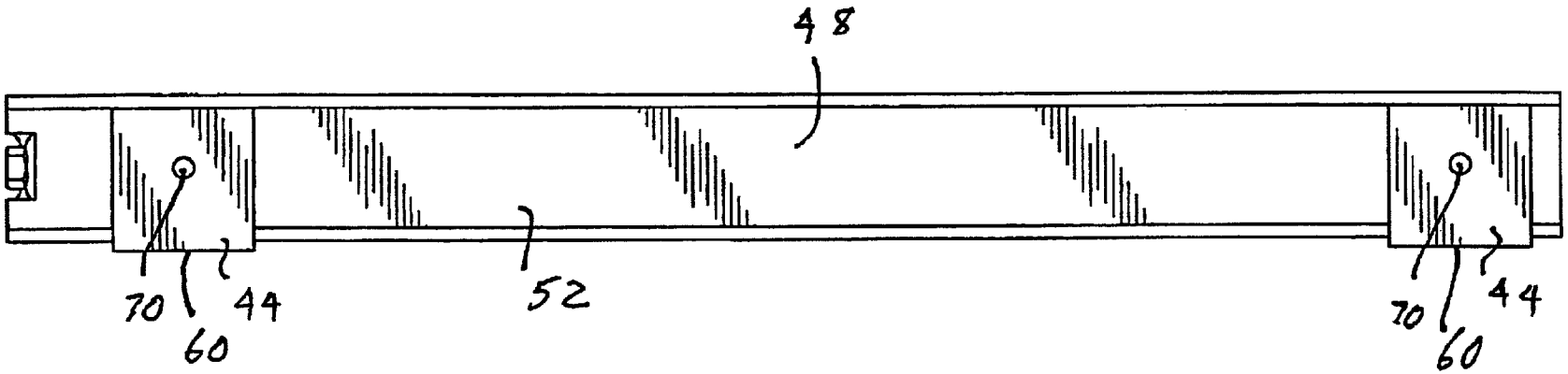
FIG. 3 is side elevation view of the drawer slide assembly shown in FIG. 2.

The movement of the drawer 10 into and out of the cabinet 12 is facilitated by the drawer slide system 14 of the present invention, which has at least one base 44 that is fixed to the cabinet bottom surface 30. The number of bases 44 employed in any given installation is a matter of choice of design, but a typical installation employs two bases as shown in FIGS. 1-3. A drawer slide system 14 of the present invention is more clearly illustrated in FIG. 2 to include three drawer slides 46, 48 and 50 that are coupled between the bases 44 and the drawer 10. Drawer slides 46 and 48 are vertically oriented while drawer slide 50 is horizontally oriented. Each of the drawer slides 46-50 generally has a fixed portion 52 that is coupled to the base 44, a movable portion 54 that is coupled to the drawer 10. The drawer slides 46-50 can include at least one bridging portion 56 that couples the fixed portion 52 to the movable portion 54. The particular structure of the drawer slides 46-50 is generally beyond the scope of the present invention and is subject to a wide choice of design. The drawer slides 46 and 48 are sufficiently accessible that conventional releasable locking mechanisms can be included in the slides to prevent unwanted withdrawal of the side access draw 10 from engagement with the drawer slides. The horizontal drawer slide 50, being less accessible, can omit such structure, if desired. The vertically oriented drawer slides 46 and 48 should be selected to carry the weight load of the drawer 10 and its expected contents. The horizontal drawer slide 50 should be selected to prevent any side to side movement of the drawer 10 as it moves into and out of the cabinet 12.

Figure 4:
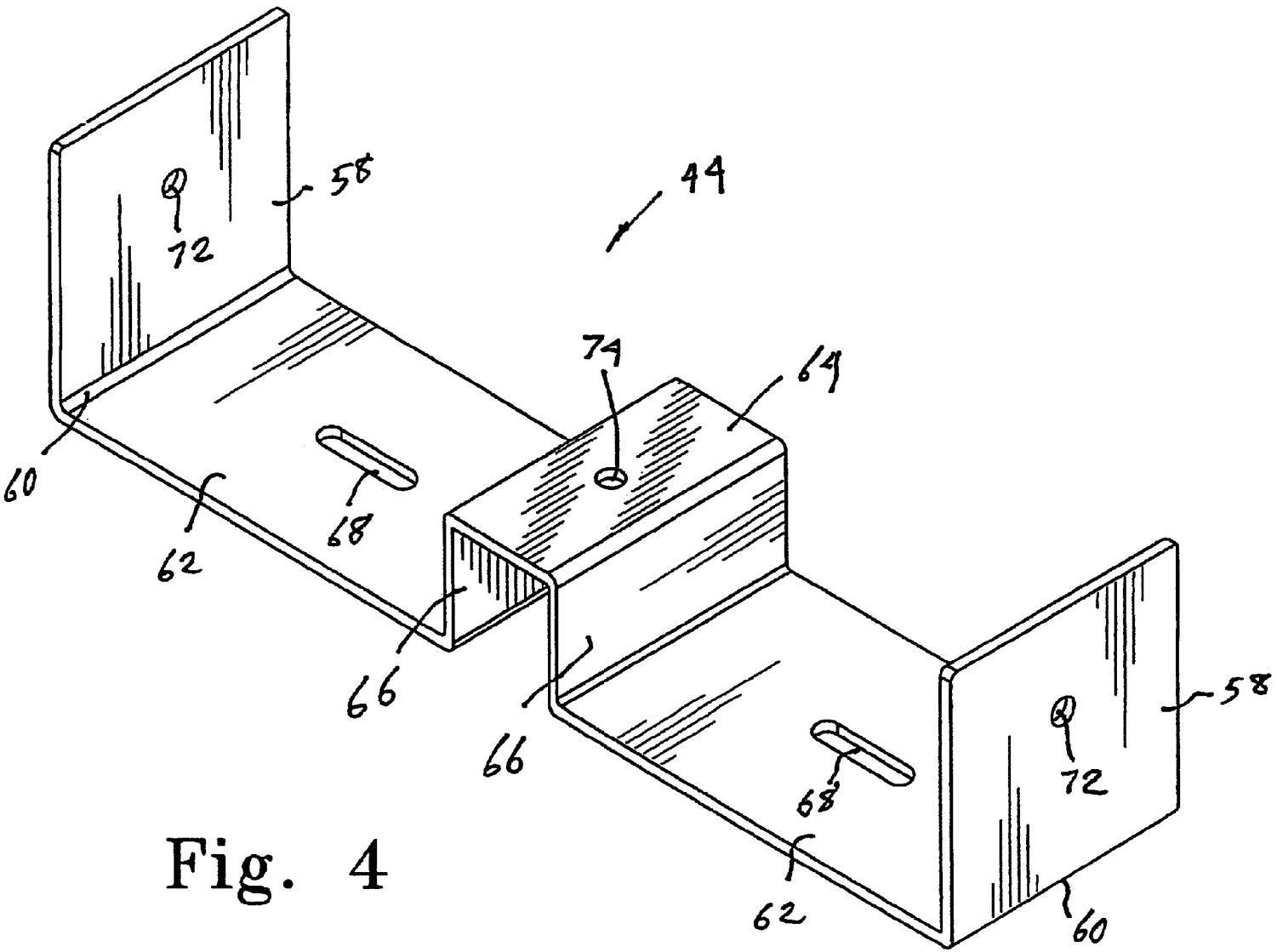
FIG. 4 is a perspective view of a base element of the present invention.

One possible base 44 of the present invention can be seen in greater detail in FIG. 4 to have an outside pair of vertical webs 58 that have lower margins 60. Lower horizontal portions 62 extend inward from lower margins 60 to a central portion 64. Central portion 64 is elevated above the lower horizontal portions 62 by inner vertical elements 66. The outside pair of vertical webs 58 can be separated from each other by any suitable distance that is less than the width of the opening 42 in the cabinet 12 intended to receive the drawer 10. The lower horizontal portions 62 can includes openings 68 designed to receive fasteners, not shown, for securing the base 44 to the bottom surface 30 of cabinet 12. The bases 44 can have any convenient longitudinal dimension L. The drawer slides 46 and 48 are coupled to inner surfaces 69 of the outside pair of vertical webs 58 by fasteners 70 passing through openings 72. The horizontally oriented drawer slide 50 is coupled to the elevated central portion 64 by fasteners passing through openings 74. The nature of the fasteners used to couple the drawer slides 46-50 to the bases 44 is a matter of choice of design beyond the scope of the present invention, and can include, for example, screws and rivets.

Figure 5:
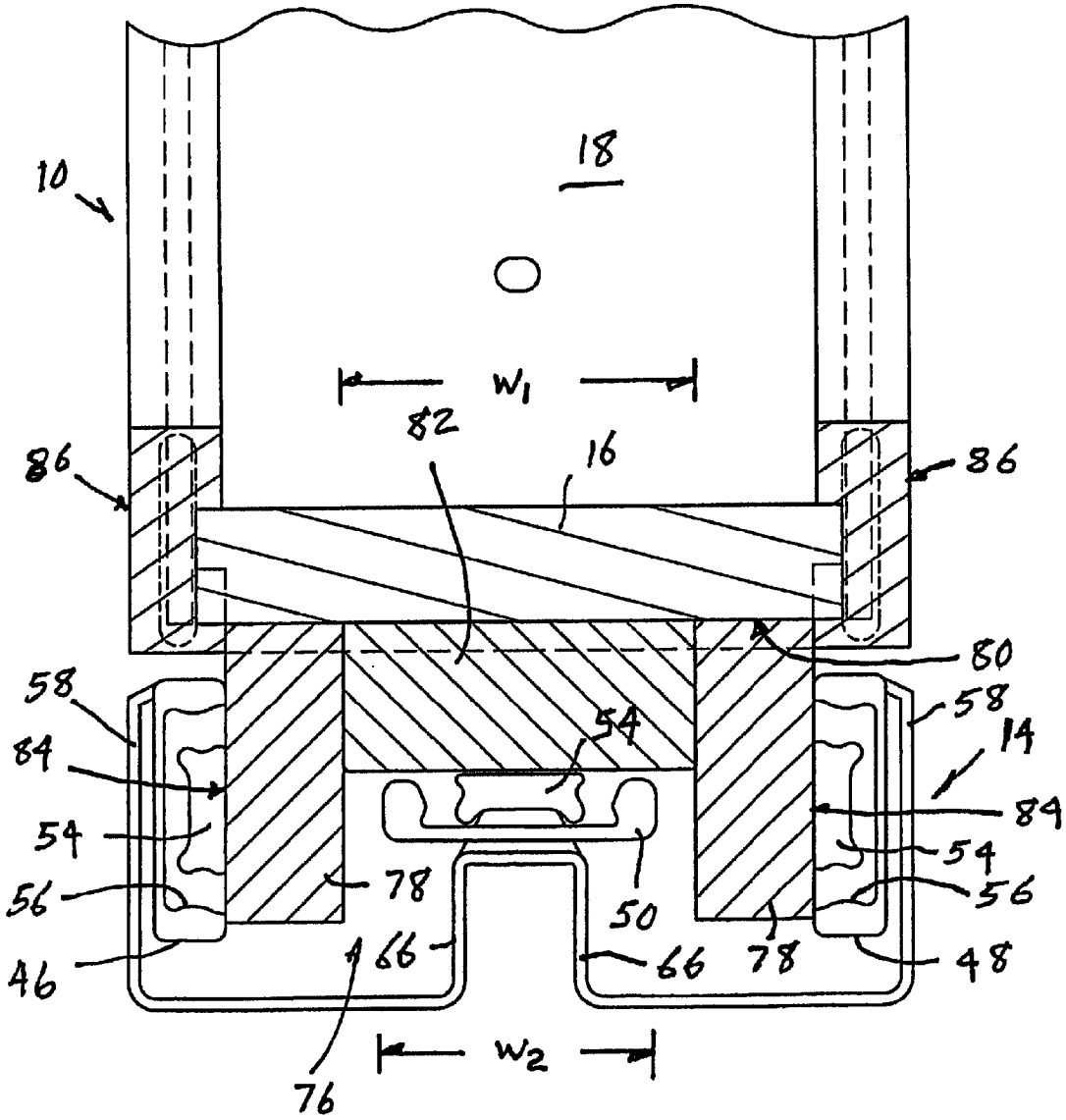
FIG. 5 is a sectional detail view of the bottom of a side access drawer coupled to a drawer slide assembly of the present invention.

One coupling arrangement 76 between a side access drawer 10 having a H/W aspect ration greater than about 2 and a drawer slide system 14 of the present invention is shown in cross-section in FIG. 5. The coupling arrangement 76 can include two longitudinal supports 78 that are fixed to a lower surface 80 of the side access drawer 10. The two longitudinal supports 78 can be spaced from each other by a spacer 82 having a width $w_1$ that exceeds the width $w_2$ of the horizontally oriented drawer slide 50. The movable portion 54 of the horizontally oriented drawer slide 50 can be fixed to the spacer 82 between the two longitudinal supports 78. The movable portions 54 of the vertically oriented drawer slides 46 and 48 can be fixed to outside surfaces 84 of the longitudinal supports 78. The outside surfaces 84 of the longitudinal supports can be located at other positions than that shown in FIG. 5, for example in alignment with outside surfaces 86 of the drawer 10. The location of the various movable portions 54 can be designated by suitable templates to ensure alignment with the fixed portions 52 of the various drawer slides 46-50 and any bridging portions 56. By suitably dimensioning the vertical elements 66 of the bases 44, the spacer 82 can be omitted and the central portion 64 can be coupled directly to the bottom shelf 16.

Other variations in dimension will become apparent to those skilled in the art that are still within the scope of the invention as defined in the following claims. The foregoing detailed description should be regarded as merely illustrative rather than limiting, and the following claims, including all equivalents, are intended to define the spirit and scope of this invention.

The invention claimed is:

1. A drawer slide system comprising:

a side access drawer having a front portion, a rear portion, and a plurality of shelves extending between the front portion and the [back] *rear* portion including a bottom shelf having lateral margins on opposite sides of the bottom shelf, two vertically oriented, longitudinally extendable, drawer slides including movable portions coupled to the bottom shelf adjacent the lateral margins of the bottom shelf, a horizontally oriented, longitudinally extendable, drawer slide including a movable portion coupled to a central portion of the bottom shelf, the vertically and horizontally oriented drawer slides having fixed portions, and at least one base coupled to the fixed portions of all the drawer slides and adapted for mounting within a cabinet, including an outside pair of vertical webs coupled to the fixed portions of the vertically oriented drawer slides, and a central portion that is elevated in height with respect to lower horizontal portions extending inward from lower margins of the outside pair of vertical webs, the central portion fixed to the fixed portion of the horizontally oriented drawer slide.

2. The drawer slide system of claim 1 further comprising longitudinal supports coupled to the drawer bottom shelf, the longitudinal supports having outside surfaces coupled to the movable portions of the vertically oriented drawer slides.

3. The drawer slide system of claim 2 wherein the longitudinal supports include inside surfaces spaced apart from each other by a distance sufficient to receive the horizontally oriented drawer slide.

4. The drawer slide system of claim 3 further comprising a spacer situated between the longitudinal supports, the spacer being coupled to the movable portion of the horizontally oriented drawer slide.

5. The drawer slide system of claim 1 wherein the lower horizontal portions include openings to receive fasteners for fastening the at least one base to the cabinet.

6. The drawer slide system of claim 5 wherein the at least one base further comprises inner vertical portions extending upward from inward margins of the lower horizontal portions, the inner vertical portions supporting said central portion.

7. The drawer slide system of claim 5 wherein said cabinet has a cabinet margin defining an opening for receiving the side access drawer and a bottom surface extending horizontally inward from a bottom portion of the cabinet margin, the at least one base being fixed to the bottom surface.

8. The drawer slide system of claim 7 wherein the cabinet margin includes side portions defining a width of the opening, the outside pair of vertical webs of the at least one base being separated by a distance nearly equal to the width of the opening.

9. The drawer slide system of claim 1 wherein the fixed portions of the vertically oriented drawer slides are coupled to inside facing surfaces of the vertical webs.

10. The drawer slide system of claim 9 wherein the lateral margins of the bottom shelf are located outside the vertical webs of the base.

11. The drawer slide system of claim [of claim] 1, 2, 3 or 4 wherein each drawer slide includes a bridging portion coupling the movable portion to the fixed portion.

12. A drawer slide system comprising:

a side access drawer having a front portion, a rear portion, and a plurality of shelves extending between the front portion and the [back] *rear* portion including a bottom shelf having lateral margins on opposite sides of the bottom shelf, two vertically oriented, longitudinally extendable, drawer slides including movable portions coupled to the bottom shelf adjacent the lateral margins of the bottom shelf, the vertically oriented drawer slides including fixed portions, a horizontally oriented, longitudinally extendable, drawer slide including a movable portion coupled to a central portion of the bottom shelf, the horizontally oriented drawer slide also having a fixed portion, and at least one base coupled to the fixed portions of all the drawer slides and adapted for mounting within a cabinet, the at least one base including an outside pair of vertical webs coupled to the fixed portions of the vertically oriented drawer slides, the vertical webs having lower margins, a central portion elevated with respect to the vertical webs lower margins and fixed to the fixed portion of the horizontally oriented drawer slide, and lower horizontal portions extending inward from the vertical webs lower margins, the lower horizontal portions including openings to receive fasteners for fastening the at least one base to the cabinet.

13. The drawer slide system of claim 12 wherein the at least one base further comprises inner vertical portions extending upward from inward margins of the lower horizontal portions, the inner vertical portions supporting said centrally situated elevated portion.

14. The drawer slide system of claim 12 further comprising longitudinal supports coupled to the drawer bottom shelf, the longitudinal supports having outside surfaces coupled to the movable portions of the vertically oriented drawer slides.

15. The drawer slide system of claim 14 wherein the longitudinal supports include inside surfaces spaced apart from each other by a distance sufficient to receive the horizontally oriented drawer slide.

16. The drawer slide system of claim 15 further comprising a spacer situated between the longitudinal supports, the spacer being coupled to the movable portion of the horizontally oriented drawer slide.

17. The drawer slide system of claim 12 wherein said cabinet has a front margin defining an opening for receiving the side access drawer and a bottom surface extending horizontally inward from a bottom portion of the front margin, the base being fixed to the bottom surface.

18. The drawer slide system of claim 17 wherein the front margin includes side portions defining a width of the opening, the outside pair of vertical webs of the at least one base being separated by a distance nearly equal to the width of the opening.

19. The drawer slide system of claim 12 wherein each drawer slide includes a bridging portion coupling the movable portion to the fixed portion.

*20. A drawer slide system comprising:*

*a drawer having a front portion, a rear portion, and a bottom shelf extending between the front portion and the rear portion, having lateral margins on opposite sides of the bottom shelf,*

*two vertically oriented, longitudinally extendable, drawer slides including movable portions coupled to the bottom shelf adjacent the lateral margins of the bottom shelf,*

*a horizontally oriented, longitudinally extendable, drawer slide including a movable portion coupled to a central portion of the bottom shelf, the vertically and horizontally oriented drawer slides having fixed portions, and*

*at least one base coupled to the fixed portions of all the drawer slides and adapted for mounting within a cabinet, including an outside pair of vertical webs coupled to the fixed portions of the vertically oriented drawer slides, and a central portion that is elevated in height with respect to lower horizontal portions extending inward from lower margins of the outside pair of vertical webs, the central portion fixed to the fixed portion of the horizontally oriented drawer slide.*

* * * * *